United States Patent
Juhola et al.

(10) Patent No.: US 9,664,825 B2
(45) Date of Patent: May 30, 2017

(54) COMPENSATION OF OPTICAL ABERRATIONS CAUSED BY NON-PLANAR WINDOWS

(71) Applicant: Nokia Corporation, Espoo (FI)

(72) Inventors: Mikko A. Juhola, Muurla (FI); Marko K. Parikka, Salo (FI); Antti I. Wright, Kangasala (FI); Timo J. Haikka, Tampere (FI); Mikko T. Hautala, Turku (FI)

(73) Assignee: Nokia Technologies Oy, Espoo (FI)

( * ) Notice: Subject to any disclaimer, the term of this patent is extended or adjusted under 35 U.S.C. 154(b) by 948 days.

(21) Appl. No.: 13/850,360

(22) Filed: Mar. 26, 2013

(65) Prior Publication Data

US 2014/0293425 A1    Oct. 2, 2014

(51) Int. Cl.
*G02B 5/18*     (2006.01)
*G02B 27/42*    (2006.01)

(52) U.S. Cl.
CPC ........ *G02B 5/1895* (2013.01); *G02B 27/4216* (2013.01)

(58) Field of Classification Search
CPC ...... G02B 5/08; G02B 5/1814; G02B 5/1876; G02B 27/0025; G02B 27/0037; G02B 27/005; G02B 27/0056; G02B 27/0062; G02B 27/42; G02B 27/4205; G02B 27/4211; G02B 27/4216; G02B 27/646
See application file for complete search history.

(56) References Cited

U.S. PATENT DOCUMENTS

| | | | |
|---|---|---|---|
| 5,581,405 A | * | 12/1996 | Meyers ................ G02B 5/1876 359/569 |
| 5,877,850 A | | 3/1999 | Ogata |
| 2004/0021945 A1 | * | 2/2004 | Tompkin .................. G02B 5/18 359/566 |

(Continued)

FOREIGN PATENT DOCUMENTS

| GB | 1 365 382 A | | 9/1974 |
|---|---|---|---|
| JP | 2004252219 A | * | 9/2004 |

OTHER PUBLICATIONS

Machine translation of JP 2004-252219 A.*

(Continued)

*Primary Examiner* — Kimberly N Kakalec
(74) *Attorney, Agent, or Firm* — Harrington & Smith

(57) ABSTRACT

The specification and drawings present a new apparatus and a new apparatus for compensation of the optical aberrations caused by a non-planar window (or windows in general, for example windows having a curved surface) using a diffractive (optical) element such as a diffractive foil in electronic/camera devices such as electronic devices with displays. According to an embodiment, an optical window of an electronic device/camera may have at least a non-planar front surface which causes an aberration of an input image. This aberration can be corrected to be below predefined one or more parameters (such as a circle with a predefined maximum radius and/or a directional shift by a predefined maximum value) using a diffractive element/foil located on/near a back surface of the optical window or between the back surface of the optical window and a sensor/camera image plane where the input image is focused on.

16 Claims, 14 Drawing Sheets

(56) References Cited

U.S. PATENT DOCUMENTS

| | | | |
|---|---|---|---|
| 2007/0030573 A1 | 2/2007 | Batchko et al. ............... | 359/665 |
| 2007/0145281 A1 | 6/2007 | Ben-Haim et al. ....... | 250/370.09 |
| 2008/0019001 A1* | 1/2008 | Suzuki ................. | G02B 27/283 |
| | | | 359/567 |
| 2010/0110547 A1* | 5/2010 | Ando ................... | G02B 5/1895 |
| | | | 359/570 |
| 2011/0122305 A1* | 5/2011 | Kobayashi ........... | G02B 5/1847 |
| | | | 348/294 |
| 2012/0300301 A1* | 11/2012 | Ando ................... | G02B 5/1814 |
| | | | 359/565 |

OTHER PUBLICATIONS

"Lens Performance", http://www.usa.canon.com/cusa/consumer/standard_display/Lens_Advantage_Perf; Jun. 14, 2012, 5 pgs.
"Single Lens Reflect (SLR) Camera Lenses that Use Laminated Diffractive Optical Elements", http://www.canon.com/technology/s_labo/light/003/02.html; Jun. 14, 2012, 5 pgs.

\* cited by examiner

FRONT CAMERA 14 UNDER CURVED GLASS 12

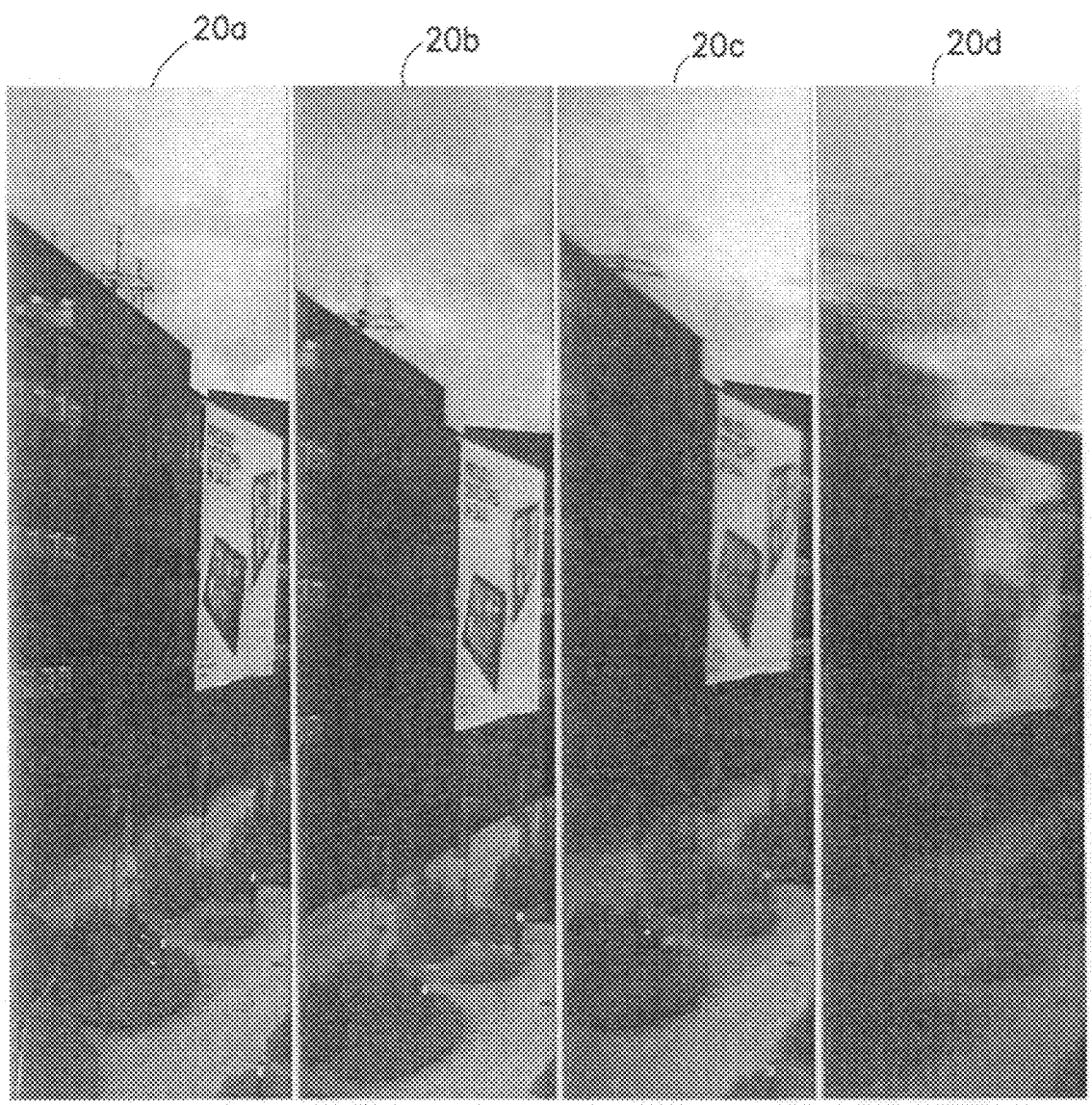

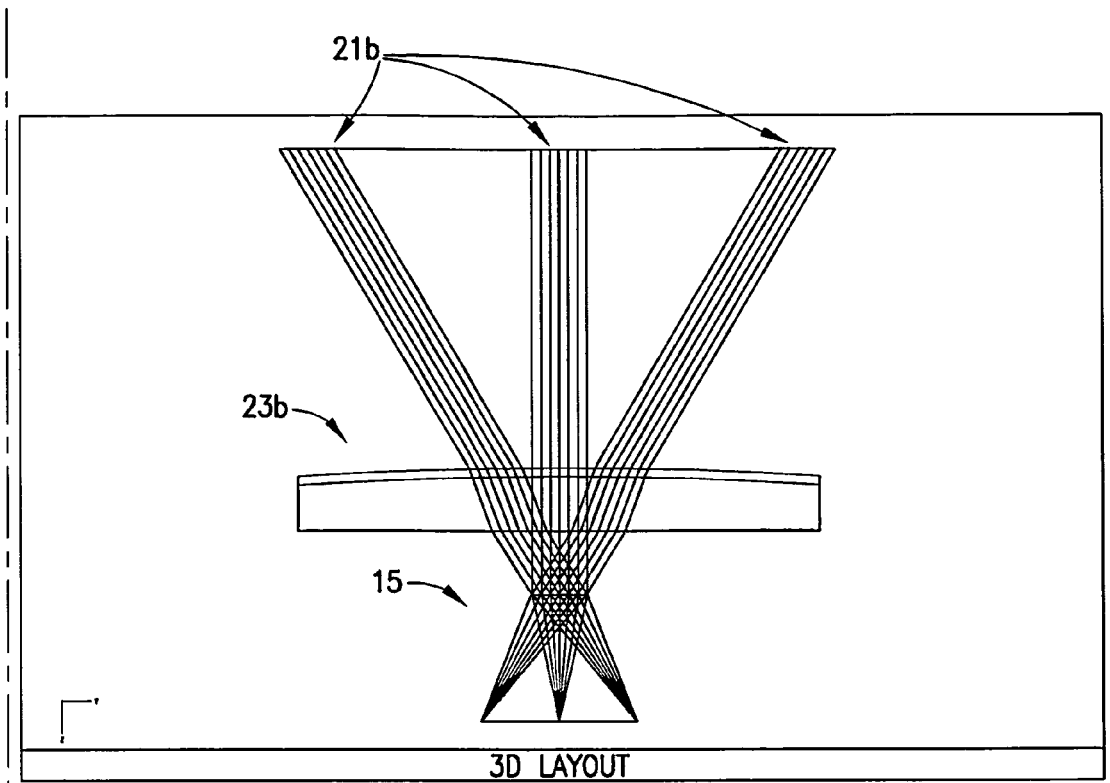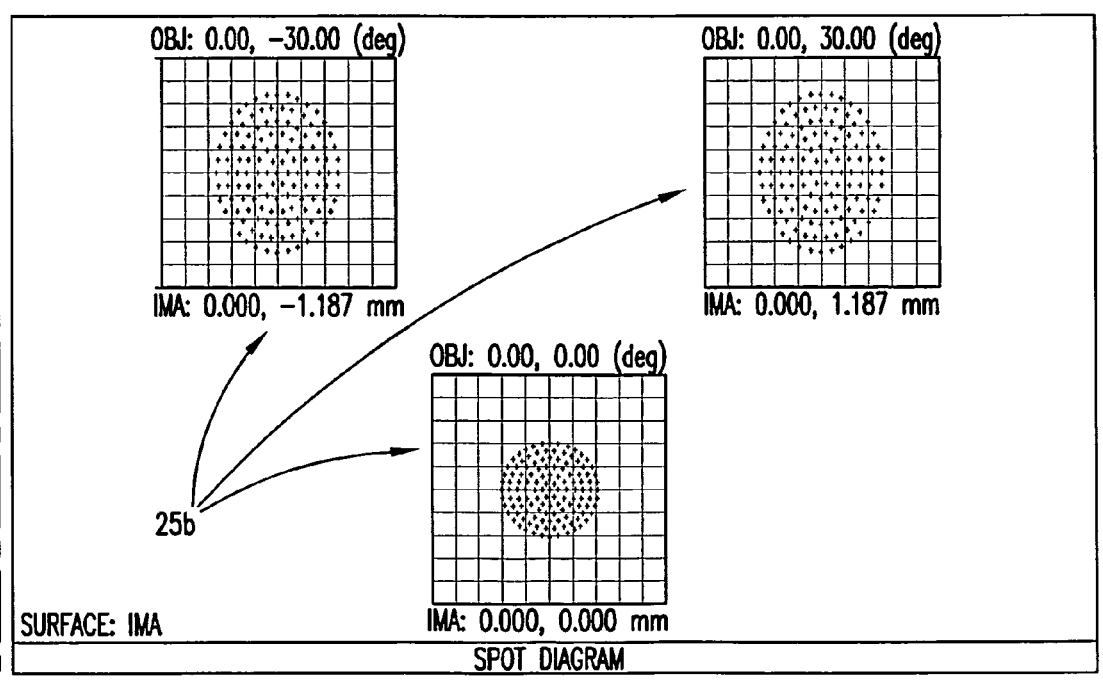
FIG.4b

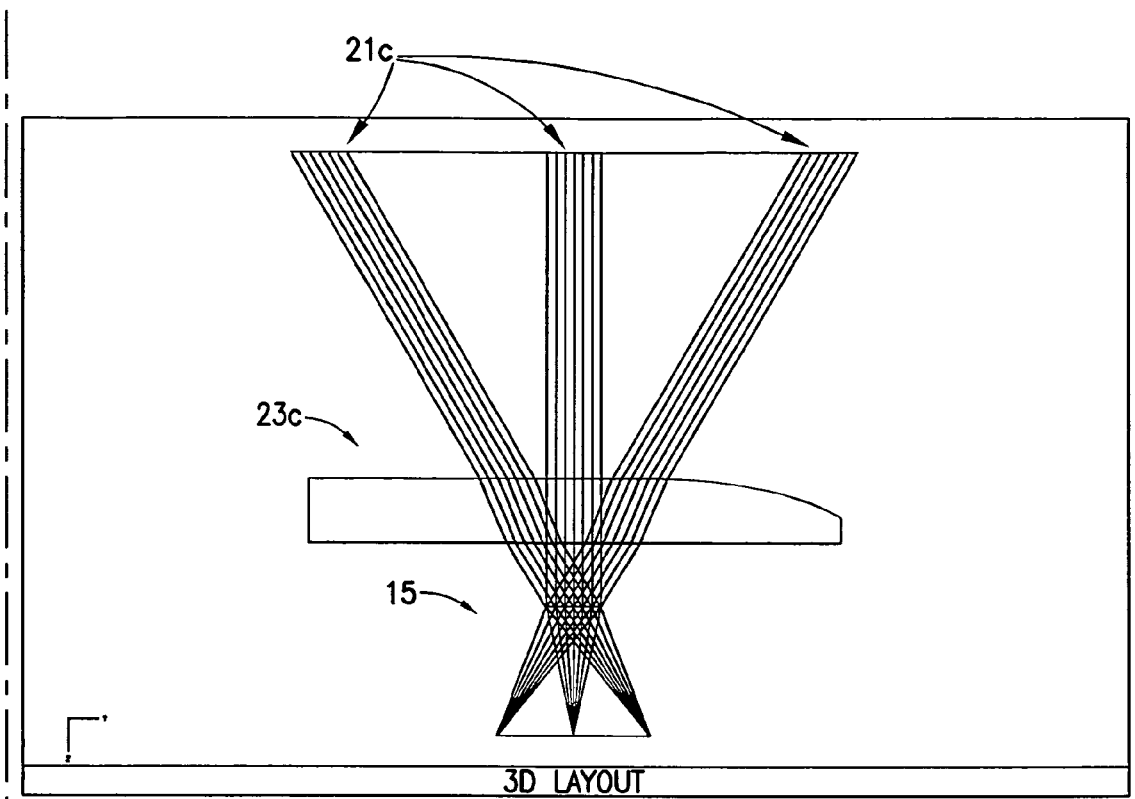
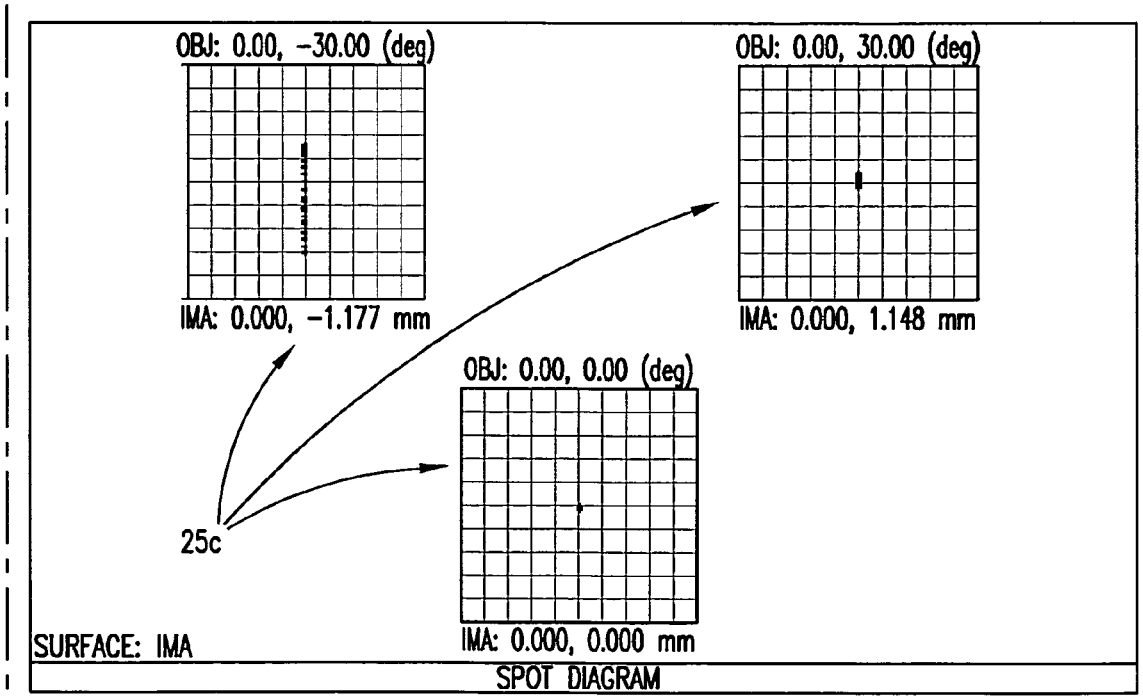
FIG.4c

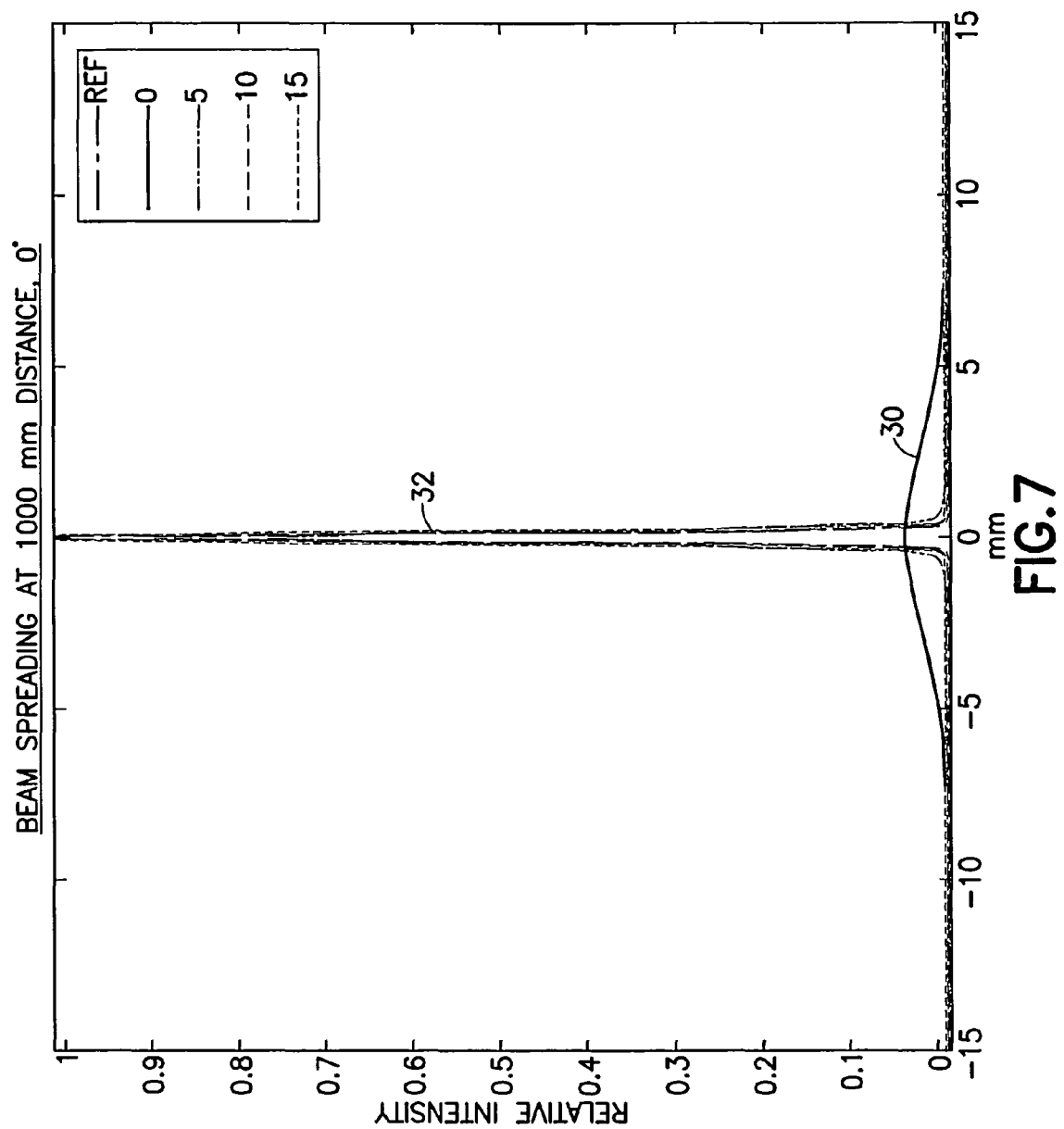

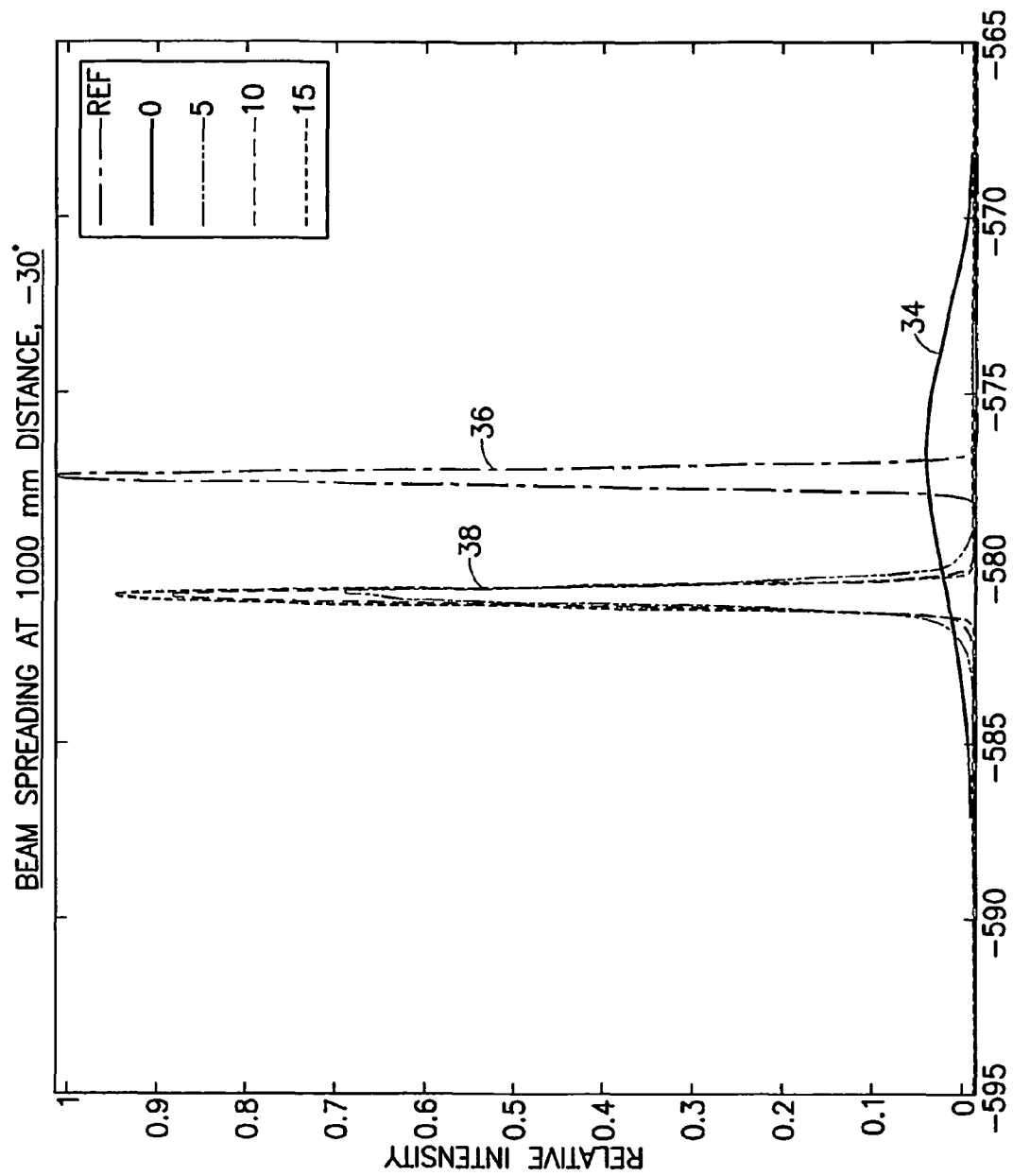

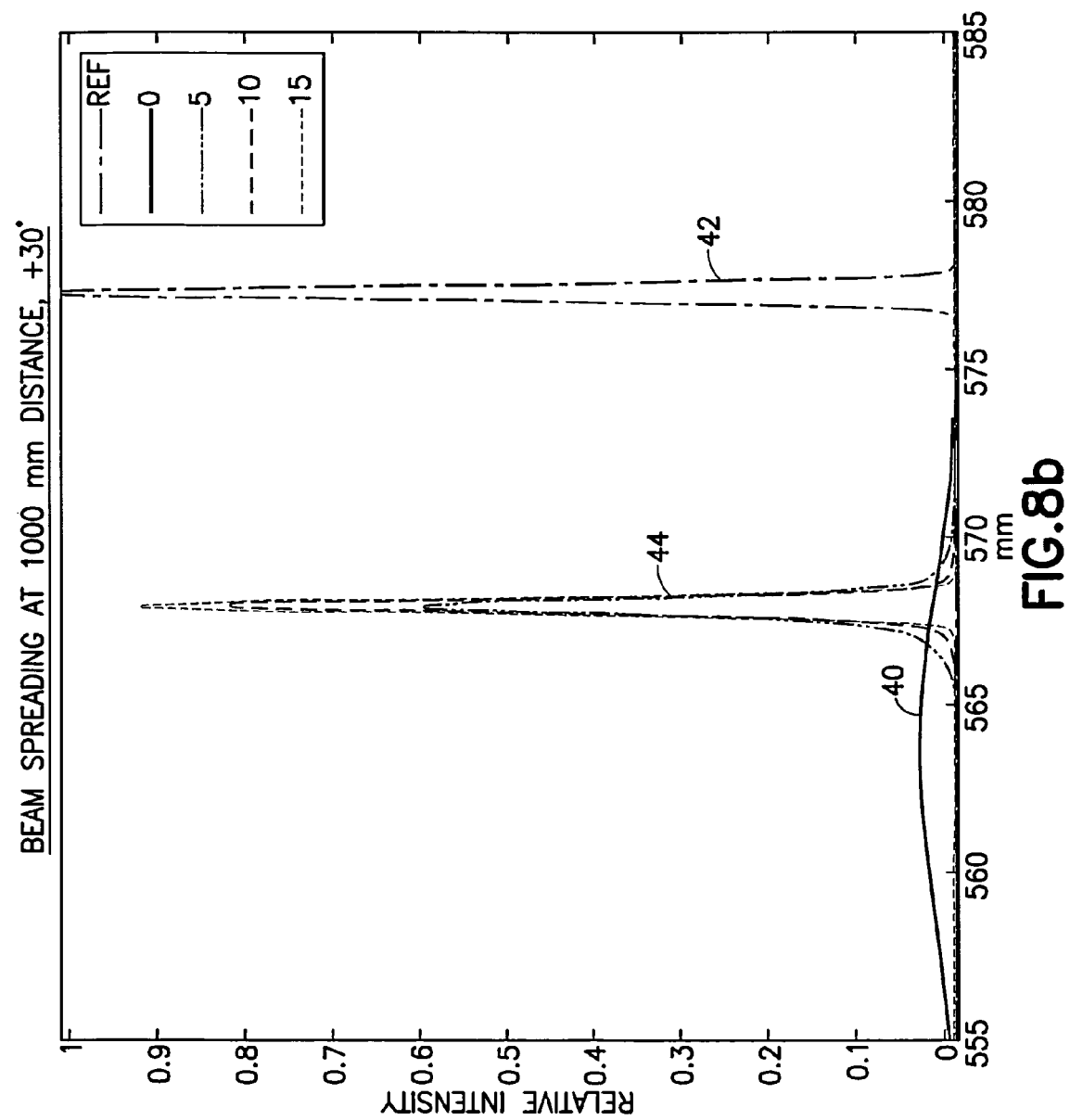

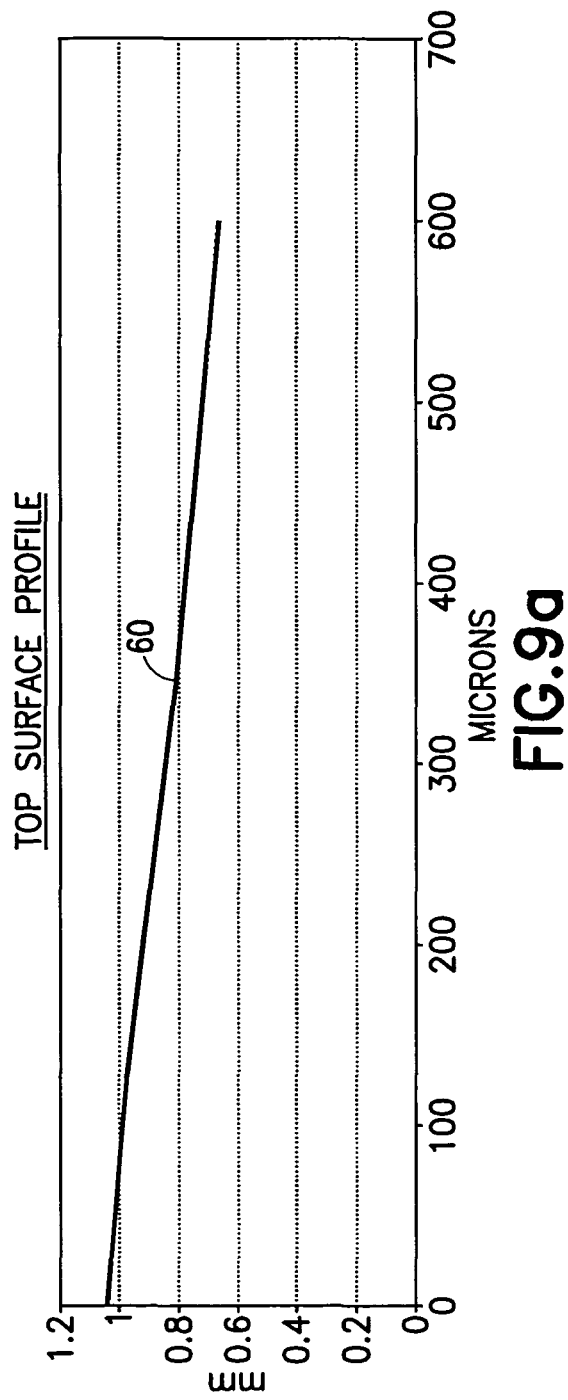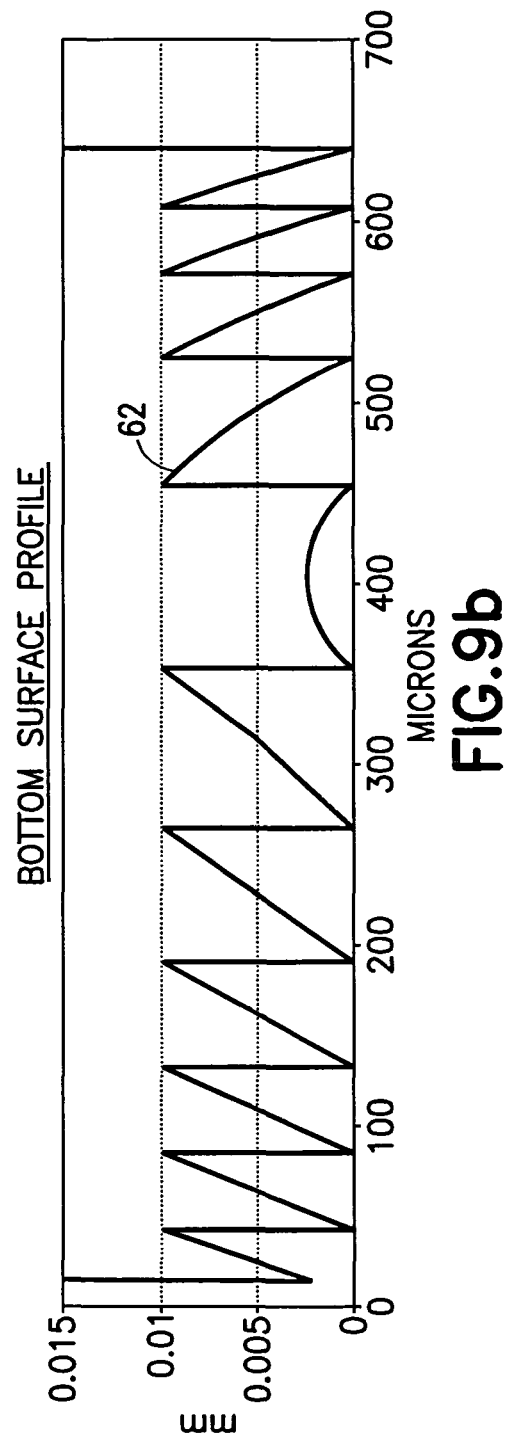

COMPENSATION OF OPTICAL ABERRATIONS CAUSED BY NON-PLANAR WINDOWS

TECHNICAL FIELD

The exemplary and non-limiting embodiments relate generally to electronic devices with displays and more specifically to compensation of optical aberrations caused by non-planar window(s) in an electronic/optical/camera device.

BACKGROUND ART

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

Non-planar optical windows such as curved glass windows can make many electronic/imaging devices look beautiful and are widely used as a marketing tool, so that flat optical windows may be undesirable from that point of view. Unfortunately, curved surfaces of these optical windows with a highly desirable non-planar shape can cause undesirable aberrations such as blurring, geometric distortion and/or displacement of an input image focused on an image plane of an imaging/sensor device such as a camera. This can cause a significant deterioration of the image generated by the camera.

SUMMARY

In accordance with one aspect, an example apparatus comprises at least one optical window having a non-planar front surface which causes aberration of an input image; and a diffractive element comprising a plurality of Fresnel zones configured to correct the aberration of the input image and located on a back surface of the at least one optical window or between the back surface and a sensor image plane where the input image is focused on. The aberration is corrected to be below predefined one or more parameters for the input image and for each wavelength of the input image for which the aberration caused by the non-planar front surface was above the predefined one or more parameters.

In accordance with another aspect, an example method, comprises receiving an input image at least one optical window of an apparatus, the window having a non-planar front surface which causes aberration of the input image; and propagating the distorted input image through a diffractive element of the apparatus, the diffractive element comprising a plurality of Fresnel zones and configured to correct the aberration of the aberrated input image and located on a back surface of the at least one optical window or between the back surface and a sensor image plane where the input image is focused on, where the aberration is corrected to be below predefined one or more parameters for the input image and for each wavelength of the input image for which the aberration caused by the non-planar front surface was above the predefined one or more parameters.

BRIEF DESCRIPTION OF THE DRAWINGS

For a better understanding of the nature and objects of the exemplary embodiments, reference is made to the following detailed description taken in conjunction with the following drawings, in which:

FIGS. 3a-3d are pictures of the same object taken using a flat window (FIG. 3a) and curved surface windows having different radius of curvature (FIGS. 3b-3d);

FIG. 7 are simulation results of optical beam spreading (relative beam intensity vs. beam spread in mm) for 0° angle beam on the screen at 1 meter distance for five cases, using exemplary embodiments described herein;

FIGS. 8a-8b are simulation result of optical beam spreading (relative beam intensity vs. beam spread in mm) for angles −30° (FIG. 8a) and +30° (FIG. 8b) beams on the screen at 1 meter distance for live cases, respectively, using exemplary embodiments described herein;

FIGS. 9a and 9b are curved top surface profile (FIG. 9a) and bottom surface (kinoform) profile (FIG. 9b) of the optical window, according to an exemplary embodiment;

DETAILED DESCRIPTION

Figure 1A:
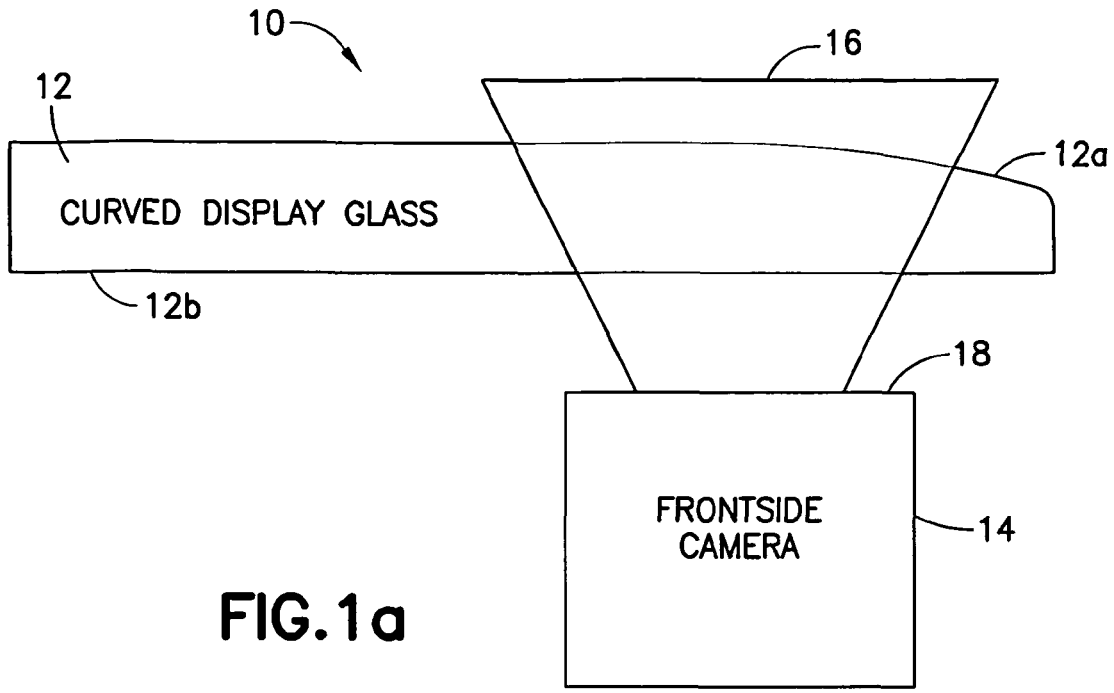
FIGS. 1a and 1b are diagrams of an electronic device comprising a curved optical window (having a curved surface and a flat surface) in front of a camera/sensor.
Figure 1B:
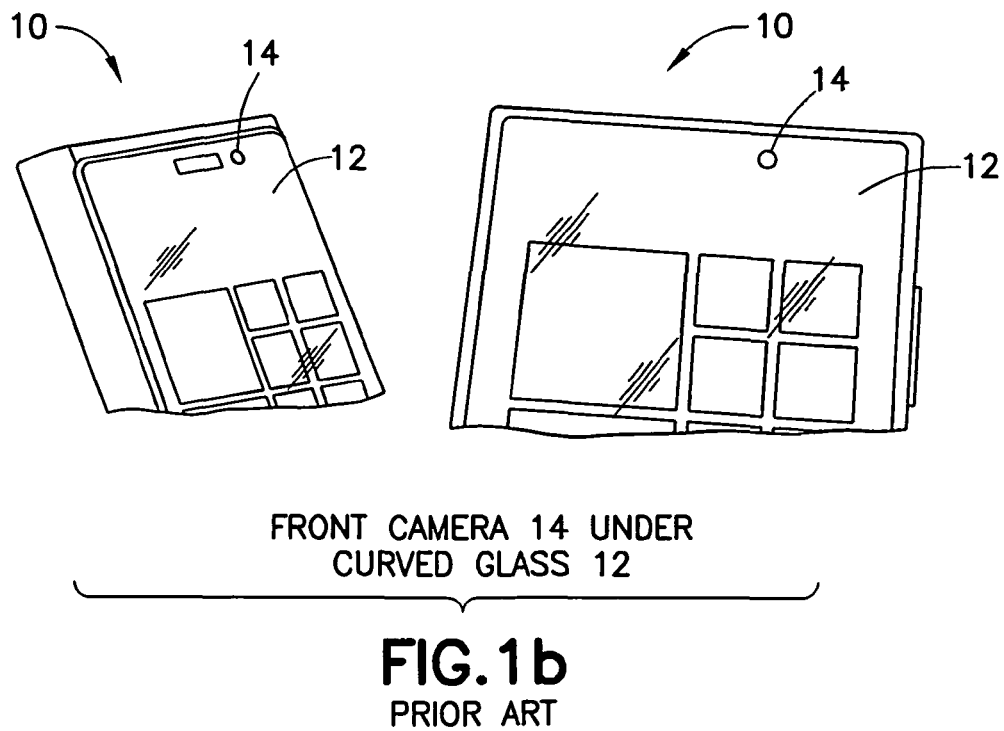

FIGS. 1a and 1b demonstrate an electronic device 10 comprising a curved optical window 12 (having a curved surface 12a and a flat surface 12b) in front of a camera/sensor 14. The curved portion 12a of the optical window 12 may cause aberrations of the input image 16 focused on a camera/sensor image plane 18. As shown in FIG. 1a, a single side curved glass on the top of the camera 14 can act as a lens blurring an image at least in one direction by moving a focal point at least in one direction for example, due to a refractive power of the curved optical surface 12a.

Figure 2:
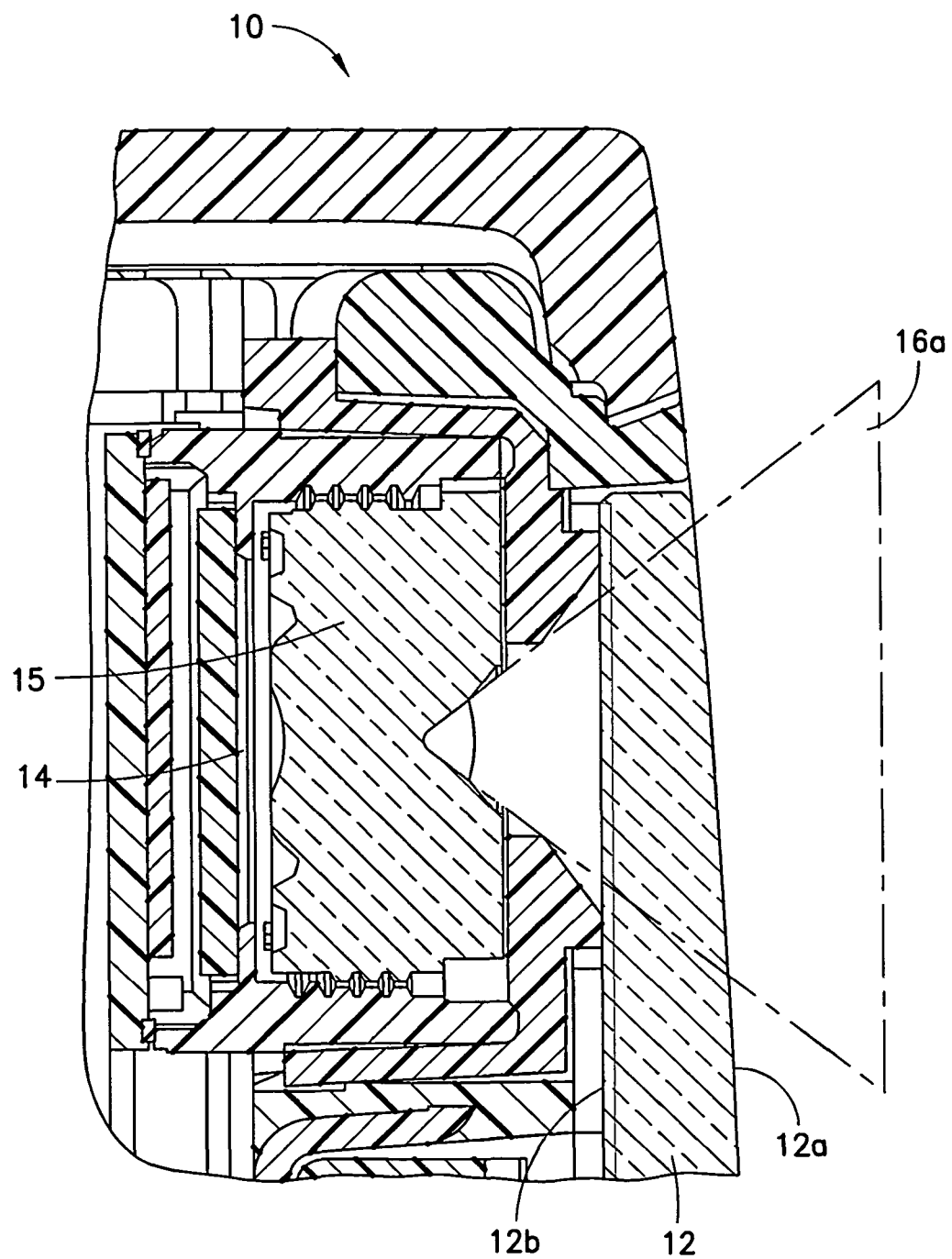
FIG. 2 is a detailed schematic diagram of an exemplary electronic device comprising a curved optical window (having a curved surface and a flat surface)

FIG. 2 shows a more detailed schematic picture of an exemplary electronic device 10a (similar to the device 10) comprising a curved optical window 12 (having a curved surface 12a and a flat surface 12b). The curved surface 12a can have a variable curvature towards one direction at the surface (for example with radius of curvature of 64.21 mm, 86.48 mm and 136.17 mm at different points/positions at the surface 12a as shown in FIG. 2). The window 12 is in front of a camera lens 15 with a focal length 1.96 mm and a camera/sensor 14 (having a sensor maximum image height of 1.4 mm) with a maximum diagonal field of view (FOV) of 72.5 degrees shown as a cone 16a.

FIGS. 3a-3d demonstrate how one-side one-direction curved window with variable radius can blur the picture 20a taken with a flat window shown in FIG. 3a with progressively deteriorated quality shown in FIG. 3b for image 20b taken using a window having a minimum radius of curvature of 70-80 mm, in FIG. 3c for image 20c taken using a window having a minimum radius of curvature of 60-70 mm and in FIG. 3d for image 20d taken using a window having a minimum radius of curvature of 40-60 mm. It is seen that at a smaller radius shown in FIG. 3d, the image is having severe aberrations.

Figure 4A:
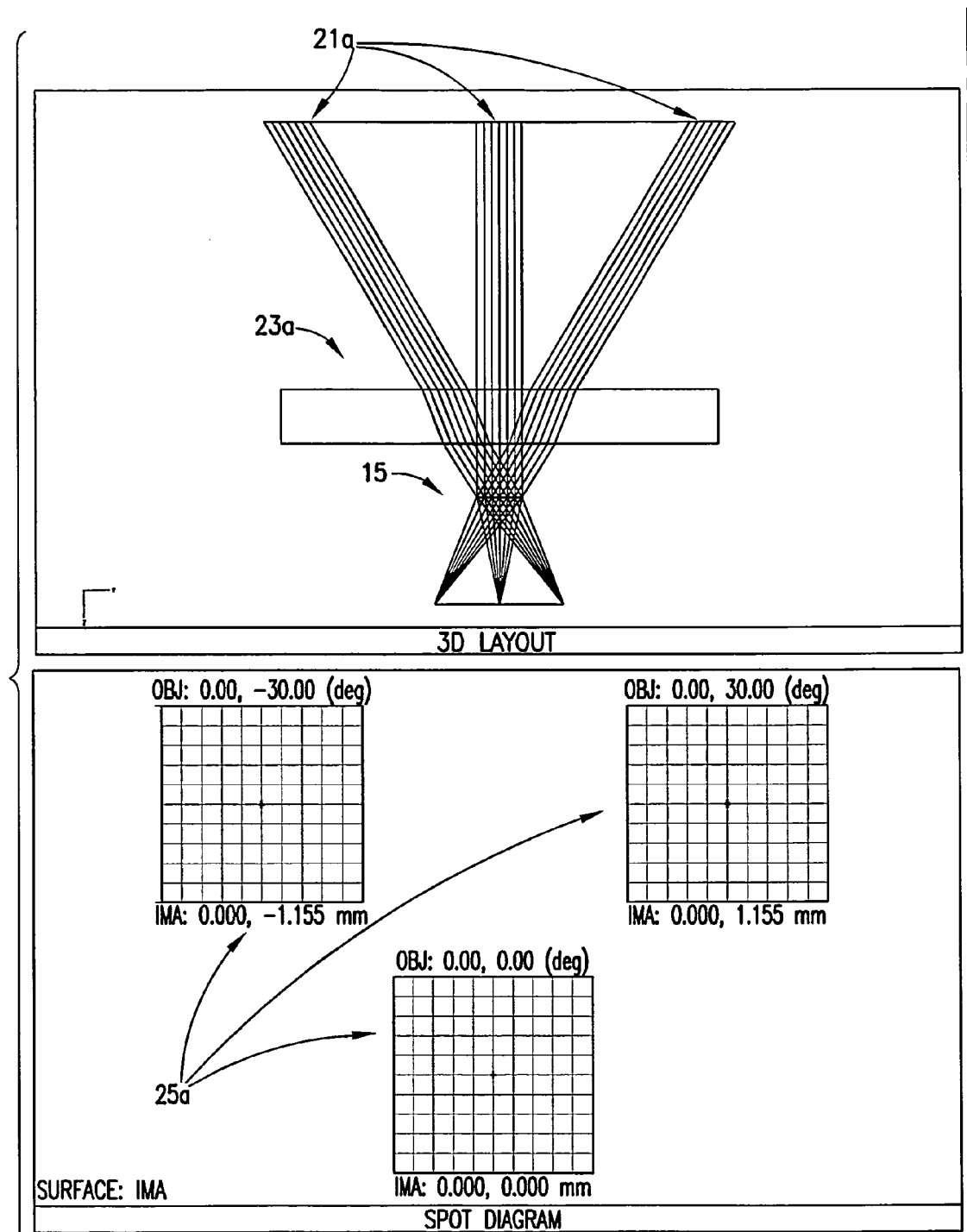
FIG. 4 is optical paths of an optical image/beam propagated through a parallel optical window 23a and propagated through an optical window 23b having a curvature on the front surface and 23c and optical window having a one directional varying curvature on the front surface.

FIG. 4 shows an optical (light) image/beam propagation path 21a through a parallel optical window 23a and an optical (light) beam propagation path 21b through an optical window 23b having a curvature on the front surface and an optical (light) beam propagation path 21c through an optical window 23c having a varying one directional curvature on the front surface. The beam/image in the propagation paths 21b is de-focused by a camera lens 15 to an area 25b which is blurred from the focal points 25a of the focused beam/image in the propagation path 21a. The beam/image in the propagation paths 21c is de-focused by a camera lens 15 to points 25c that are blurred from the focal points 25a to a rotationally-symmetrical one-directional blur.

In the embodiments described herein an emphasis is on correcting aberrations due to refractive power of the curved optical surface of the optical window which may result in focus errors at image plane (at points 25b and 25c) shown in FIG. 4. This correction can be applied to each individual spectral component/wavelength comprised in the input image for which the aberrations caused by the non-planar front surface of the optical window 23b or 23c is above the predefined value (for example, a circle with a predefined maximum radius and/or a directional shift by a predefined maximum value).

The aberrations caused by the non-planar window 12 (due to refraction on the non-planar surface of the optical window) can comprise geometric distortion and blurring of the input image. As emphasized in FIG. 2 (also see FIGS. 1a and 4) one non-planar front surface 12a of the optical window 12 may be a curved surface or a curved surface with a variable curvature.

To overcome the aforementioned problems related to the optical aberrations (blurring/geometric distortion) caused by a non-planar optical window, a new apparatus and method are presented for compensation of the optical aberrations caused by a non-planar window (for example windows having a curved surface) using a diffractive (optical) element such as a diffractive foil in electronic/camera devices such as electronic devices with displays.

According to an embodiment, an optical window (or windows in general) of an electronic device/camera may have at least a non-planar front surface (in general it may be more than one non-planar surface) which causes aberration of an input image, so that these aberrations, according to an embodiment described herein, can be corrected to be below predefined one or more parameters such as a circle with a predefined maximum radius and/or a directional shift by a predefined maximum value) using a diffractive element/foil located on/near a back surface of the optical window or between the back surface of the optical window and a sensor/camera image plane where the input image is focused on (for example the diffractive element may be in a close proximity to the sensor image plane of a sensor), wherein the aberrations are corrected to be below the predefined level for the input image and for each wavelength of the input image for which the aberration caused by the non-planar front surface was above the predefined one or more parameters. In other words, the diffractive element may be configured to offset at least in part a refractive power of the non-planar front surface (such as the curved surface) of the optical window.

The embodiments described herein can eliminate a need to use bulky optical lenses for correcting optical aberrations of the image caused by the non-planar window surface.

Figure 5:
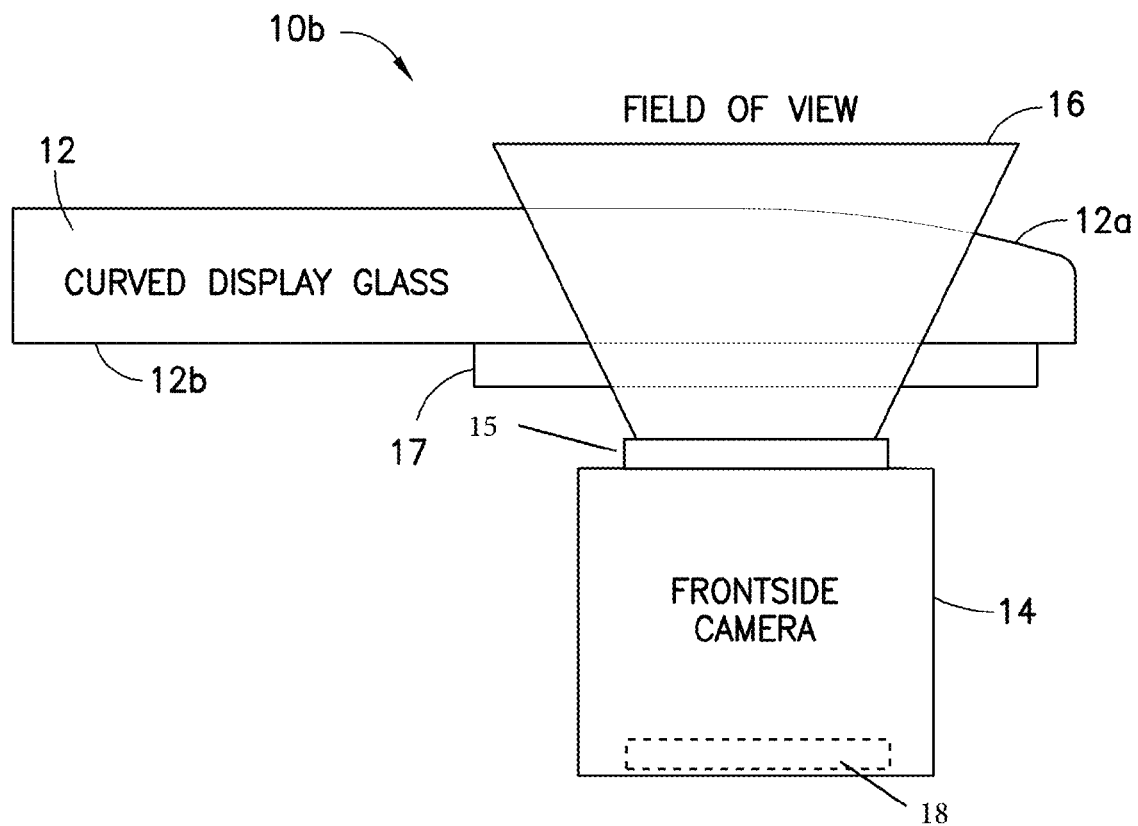
FIG. 5 is a diagram of an electronic device comprising a curved optical window (having a curved surface and a flat surface) with a compensating diffraction structure in front of a camera/sensor, according to an exemplary embodiment.

FIG. 5 illustrates a concept of the exemplary embodiment. In FIG. 5 the electronic device 10b comprise the same elements as the electronic device 10 in FIG. 1a. But in addition, the electronic device 10b comprises a diffractive component/foil 17 attached to the back surface 12b of the curved optical window 12. This diffractive component/foil 17 may be configured to eliminate/reduce aberrations caused by the curved optical window 12, per the exemplary embodiment described herein.

In a non-limiting example, the diffractive element/foil 17 may be implemented as a diffractive foil having for example 4-5 Fresnel zones per mm with a height of 5 microns, 10 microns or 15 microns, respectively. It is further noted that sizes (periods) of the Fresnel zones may be variable to account for a possible variable curvature of the front surface 12a of the optical window 12 (see FIG. 2).

As shown in a non-limiting example of FIG. 5, the diffractive element/foil 17 may be configured (for example, glued) on the back surface 12b of the optical window 12. But in general, the diffractive element/foil 17 may be placed at any location between the back surface 12b of the curved optical window 12 and a sensor/camera image plane 18 (which could be a sensor surface of a camera component) where the input image is focused on.

Moreover, the electronic device 10b may comprise an objective lens 15 located between the back surface 12b of the optical window 12 and a sensor image plane 18; the objective lens 15 can be configured to focus the input image on the sensor image plane 18, wherein the diffractive element may be glued to or configured on or near one surface of the objective lens 15.

Furthermore, the camera component 14 in FIG. 5 may comprise charged-coupled devices (CCD) or complementary metal-oxide-semiconductor (CMOS) sensors. The diffractive element/foil 17 may be attached or be configured on or near the component 14 having the sensor surface 18. The electronic device 10b may be implemented as a portable or non-portable electronic device, a computer, a wireless communication device with a display, a camera phone and the like.

It is further noted that the embodiments described herein can be also applied to a case when both surfaces of the optical window are non-planar, for example curved surfaces and to a case of multiple directionalities of the curvatures in an optical window (for example 2-directional curved window, etc.). Also the embodiments described herein may be used to correct optical distortion caused by more than one optical window, for example the camera device may have a first protective window and a second decorative window both having curved surfaces.

Figure 6:
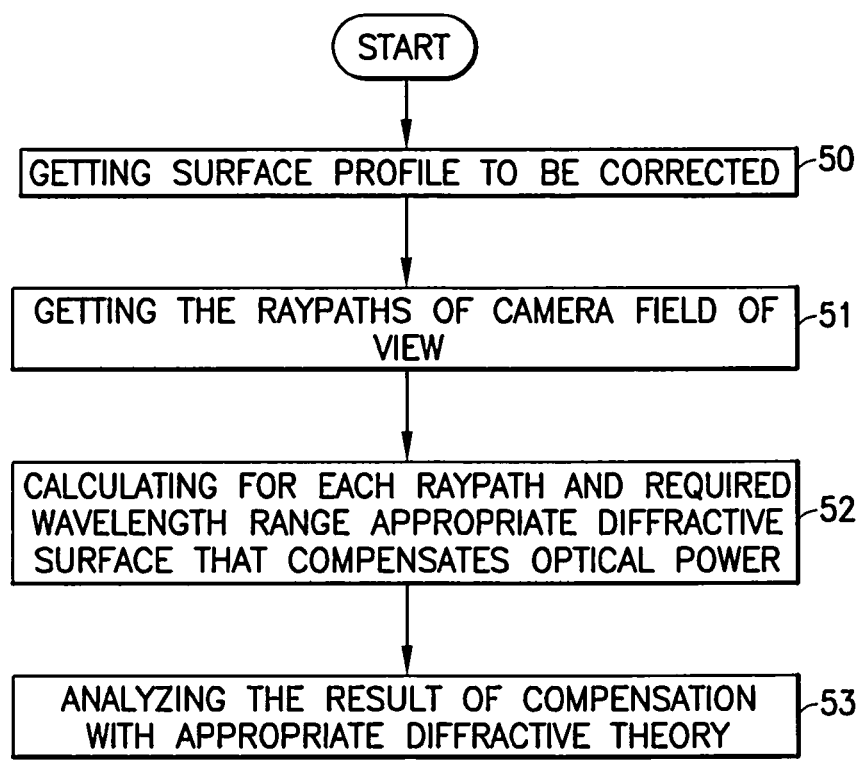
FIG. 6 is an illustration of optical design implementation, according to an exemplary embodiment.

FIG. 6 shows an example of a flow chart demonstrating optical design implementation according to an exemplary embodiment. It is noted that the order of steps shown in FIG. 6 is not absolutely required, so in principle, the various steps may be performed out of the illustrated order. Also certain steps may be skipped or selected steps or groups of steps may be performed in a separate application.

In a method according to this exemplary embodiment, as shown in FIG. 6, in a first step 50, an optical window of an apparatus (such as an electronic device with a display, camera, etc.) is provided for analysis, the optical window having a non-planar front surface which causes an aberration of the input image.

In a step 51, the ray paths through this optical window are defined.

In a step 52, the diffractive element of the apparatus comprising a plurality of Fresnel zones is configured to correct the aberrations caused by non-planar surface of window to be below predefined one or more parameters and located for example, on a back surface of the optical window or between the back surface and a sensor image plane where the input image is focused on.

In step 53 the resulting compensation of the aberrations is analyzed to determine whether aberrations are below the predefined level (which may be represented by one or more parameters) for the input image and for each wavelength of the input image for which the aberrations caused by the non-planar front surface was above the predefined one or more parameters.

FIGS. 7 and 8a-8b demonstrate simulation results for a curved (non-planar) optical window in a camera/electronic device using exemplary embodiments described herein. The analysis is performed for a diffractive element on the back optical surface of the curved optical window to compensate aberration caused by a curved front surface of the optical window. The analysis is performed using ray optics based on a scalar diffraction theory. White light at a wavelength range of 400-800 nm was used in the analysis.

Moreover, Fresnel zone surfaces with a height of 5, 10 and 15 micron were used for analysis. Also height 0 was analyzed (no Fresnel zones, no modulation). Spreading of diffraction limited optical beams at angles −30°, −15°, 0°, 15° and 30° were analyzed. Only curvature of the front surface was compensated by optical diffractive element on the back surface of the optical window. Starting level was tilted 1.782° to compensate a position shift caused by a prism shape of the optical window. Small prism shape is causing very small amount of aberrations compared to the curvature of window.

In the analysis a multicolor beam with Gaussian intensity profile was propagated through the optical window (having a curvature as described herein) to a screen at 1 meter distance. Beam spreading was compared to the reference (no window, no tilting, direct propagation to the screen).

FIG. 7 show spread results (relative beam intensity vs. beam spread in mm) for 0° angle beam on the screen at 1 meter distance for five cases:

1) "reference" case: no optical window,
2) '0' case: optical window with a curved front surface, no Fresnel zones (no compensation),
3) '5' case: optical window with a curved front surface with Fresnel zones of 5 micron height for compensation of optical aberration caused by the curved front surface,
4) '10' case: optical window with a curved front surface with Fresnel zones of 10 micron height for compensation of optical aberration caused by the curved front surface,
5) '15' case: optical window with a curved front surface with Fresnel zones of 15 micron height for compensation of optical aberration caused by the curved front surface.

It is seen from FIG. 7 that a curve 30 corresponding to the case 2) has a substantial spread due to the optical aberrations caused by the curved front surface of the optical window. However, a curve 32 corresponding to practically coinciding cases 1), 3), 4) and 5) described herein show very small spread, so that all three types of diffraction elements corresponding to the cases 3), 4) and 5) provide a good compensation of the blurred image caused by the curved front surface of the optical window.

FIGS. 8a-8b show similar results as in FIG. 7 except for beams with angles −30° (FIG. 8a) and (FIG. 8b), respectively.

It is seen from FIG. 8a that a curve 34 corresponding to the case 2) has a substantial spread due to the optical aberrations caused by the curved front surface of the optical window. However, a curve 36 corresponding to the case 1) and a curve 38 corresponding to practically coinciding cases 3), 4) and 5) described herein show very small spread, so that all three types of diffraction elements corresponding to the cases 3), 4) and 5) provide a good compensation of the blurred image caused by the curved front surface of the optical window. However, there exists a position shift between the curves 36 and 38 where the diffraction element in cases 3), 4) and 5) only partially compensate the position shift. But this position shift correspond keystone type geometric distortion, and small amount of that is invisible for the user. And device user can also compensate this type of distortion by small tilt of the device.

It is further seen from FIG. 06 that a curve 40 corresponding to the case 2) has a substantial spread due to the optical aberrations caused by the curved front surface of the optical window. However, a curve 42 corresponding to the case 1) and a curve 44 corresponding to practically coinciding cases 3), 4) and 5) described herein show very small spread, so that all three types of diffraction elements corresponding to the cases 3), 4) and 5) provide a good compensation of the blurred image caused by the curved front surface of the optical window. However, there exists a position shift (even more pronounced than in FIG. 8a) between the curves 36 and 38 where the diffraction element in cases 3), 4) and 5) only partially compensate the position shift. But this position shift correspond keystone type geometric distortion, and small amount of that is invisible for the user. And user can also compensate this type of distortion by small tilt of the device.

Tables 1 and 2 below summarized the effects of optical surface for the curved camera window for cases 2) through 5) above compared to a reference case 1).

TABLE 1

Change in FWHM (full width at half maximum) beam size compared to a reference beam size[mm]

| angle | 0 μm | 5 μm | 10 μm | 15 μm |
|---|---|---|---|---|
| −30° | 8.55 | 0.13 | 0.05 | 0.03 |
| −15° | 6.59 | 0.06 | 0.02 | 0.01 |
| 0° | 6.29 | 0.05 | 0.01 | 0.00 |
| 15° | 7.31 | 0.07 | 0.02 | 0.01 |
| 30° | 10.48 | 0.16 | 0.06 | 0.03 |

TABLE 2

Position shift [mm]

| angle | ref | 0 μm | 5 μm | 10 μm | 15 μm |
|---|---|---|---|---|---|
| −30° | −577.3 | 0.58 | −3.32 | −3.36 | −3.39 |
| −15° | −267.9 | 1.31 | −0.06 | −0.07 | −0.07 |
| 0° | 0.00 | 0.02 | 0.00 | 0.01 | 0.01 |
| 15° | 267.95 | −3.71 | −2.27 | −2.26 | −2.26 |
| 30° | 577.35 | −13.78 | −9.37 | −9.36 | −9.35 |

It is seen from Tables 1 and 2 that without compensation (case 2), beam spreading is significant. Also it is shown that all 5, 10 and 15 micron diffraction elements corresponding to cases 3)-5) behave in a similar way. Beam spreading is minimal but position shift is close to an acceptance limit (about 10 mm) at 30°.

FIGS. 9a and 9b show an example of curved top surface 60 (FIG. 9a) profile (FIG. 9a) and bottom surface (kinoform) profile 62 (FIG. 9b) of the optical window, according to an exemplary embodiment. The curved top surface 60 has a variable curvature and the profile 62 has a variable period of Fresnel zones to account for this variable curvature of the curved top surface 60.

Figure 10:
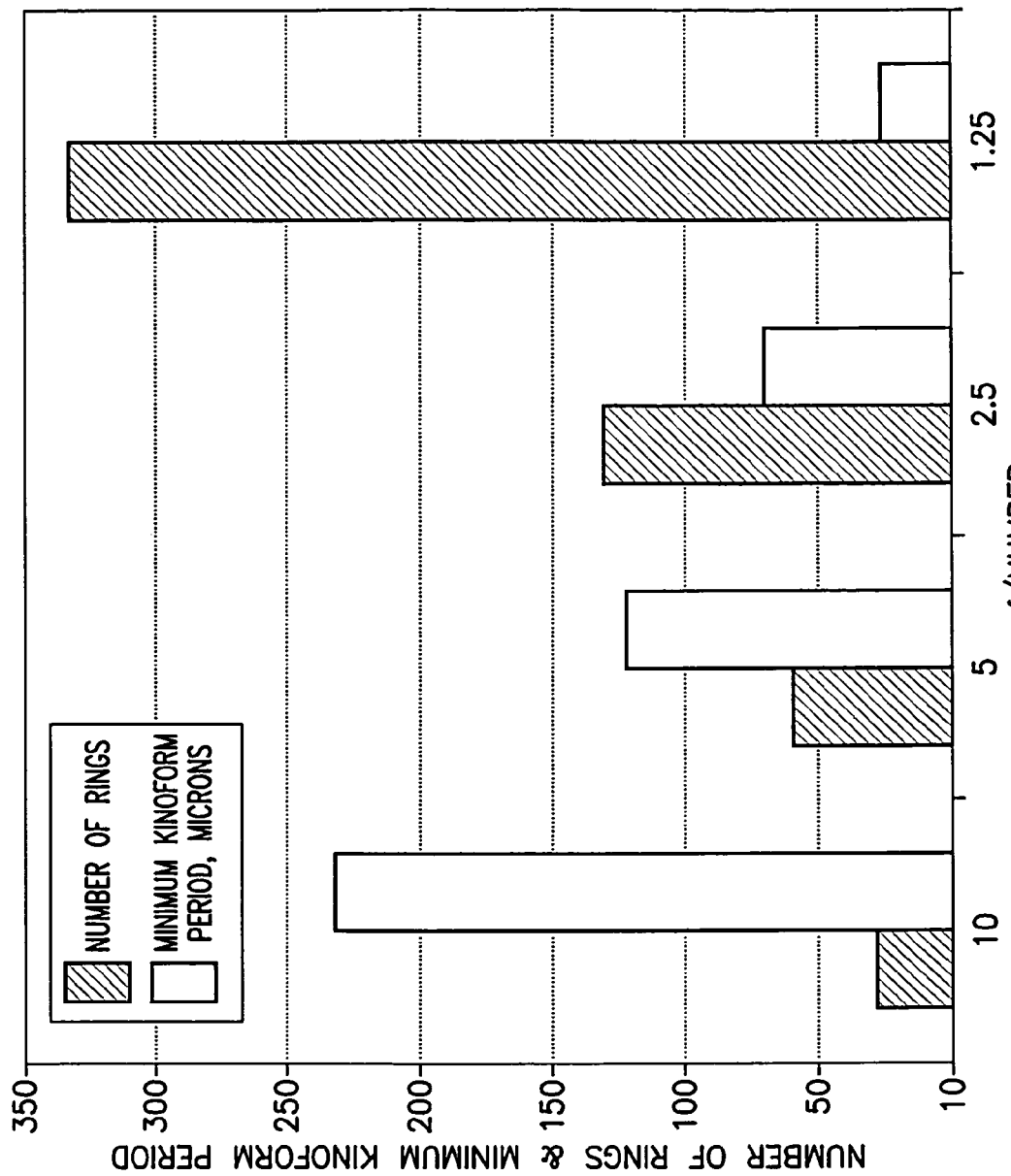
FIG. 10 is a diagram demonstrating dependence of a number of rings (Fresnel zones) and a minimum kinoform period as a function of f/number of a hybrid singlet example, according to exemplary embodiments.

FIG. 10 shows a diagram demonstrating dependence of a number of rings (Fresnel zones) and a minimum kinoform period as a function of f/number of a hybrid singlet example, according to exemplary embodiments described herein (see "Optical System Design" by Robert Fischer). This example shows that for relative aperture of 2.5 it may be appropriate to have about 60 microns minimum kinoform period. Thus rather large kinoform in periods can be called diffractive element.

Figure 11:
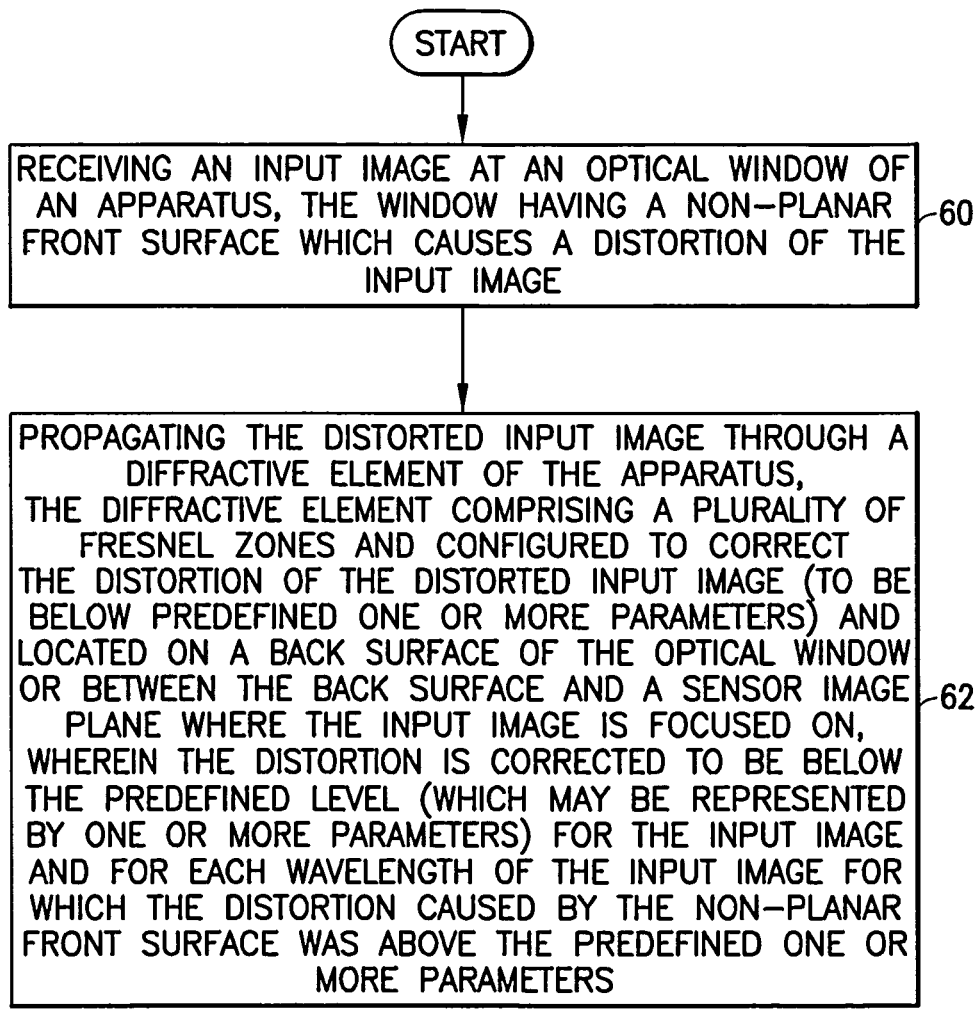
FIG. 11 is a flow chart demonstrating implementation of exemplary embodiments described herein.

FIG. 11 shows an example of a flow chart demons rating implementation of exemplary embodiments by an apparatus/electronic device. It is noted that the order of steps shown in FIG. 11 is not absolutely required, so in principle, the various steps may be performed out of the illustrated order. Also certain steps may be skipped or selected steps or groups of steps may be performed in a separate application.

In a method according to this exemplary embodiment, as shown in FIG. 911, in a first step 60, an optical window of an apparatus (such electronic device with the display) receives an input image, the window having a non-planar front surface which causes a distortion of the input image.

In a step 62, the distorted input image is propagating through a diffractive element of the apparatus, the diffractive element comprising a plurality of Fresnel zones and configured to correct the distortion of the distorted input image to be below predefined one or more parameters and located on a back surface of the optical window or between the back surface and a sensor image plane where the input image is focused on, wherein the distortion is corrected to be below the predefined level (which may be represented by one or more parameters) for the input image and for each wavelength of the input image for which the distortion caused by the non-planar front surface was above the predefined one or more parameters.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

The following abbreviations that may be found in the specification and/or the drawing figures are defined as follows:

CCD charge-coupled device
CMOS complementary metal-oxide-semiconductor
FOV field of view
FWHM full width at half maximum

What is claimed is:

1. An apparatus comprising:
   at least one optical window having a non-planar front surface which causes aberration of an input image, and having an opposed planar back surface;
   a camera comprising an objective lens disposed between the optical window and a sensor image plane at which the objective lens is configured to focus the input image; and
   a diffractive element comprising a plurality of Fresnel zones configured to correct the aberration of the input image due at least to the non-planar front surface and located on the planar back surface of the at least one optical window.

2. The apparatus of claim 1, wherein the diffractive element is configured to offset at least in part a refractive power of the non-planar front surface.

3. The apparatus of claim 1, wherein the at least one non-planar front surface has a variable curvature.

4. The apparatus of claim 1, wherein the diffractive element comprises a diffractive foil.

5. The apparatus of claim 1, wherein at least two of the Fresnel zones have different periods.

6. The apparatus of claim 1, wherein the diffractive element comprises four to five Fresnel zones per 1 mm.

7. The apparatus of claim 1, wherein the Fresnel zones have a height of 5 microns, 10 microns or 15 microns.

8. The apparatus of claim 1, wherein the camera component comprises coupled-charged devices or complementary metal-oxide-semiconductor sensors.

9. The apparatus of claim 1, wherein the aberration comprises a position shift and blurring of the input image.

10. The apparatus of claim 1, wherein the diffractive element is configured to correct the aberration of the input image to be defined as one or more of: a circle with radius no more than a predefined maximum radius and a directional shift no more than a predefined maximum value.

11. A method, comprising:
    receiving an input image via at least one optical window of an apparatus, the window having a non-planar front surface which causes aberration of the input image and an opposed planar back surface on which is disposed a diffractive element comprising a plurality of Fresnel zones, said diffractive element configured to correct the aberration of the input image due at least to the non-planar front surface; and
    propagating the input image through the optical window and the diffractive element to a camera of the apparatus, the camera comprising an objective lens and a sensor image plane, where said objective lens is disposed between the at least one optical window and the sensor image plane upon which the objective lens is configured to focus the input image.

12. The method of claim 11, wherein the diffractive element is configured to offset at least in part a refractive power of the non-planar front surface.

13. The method of claim 11, wherein the at least one non-planar front surface has a variable curvature.

14. The method of claim 11, wherein the diffractive element comprises a diffractive foil.

15. The method of claim 11, wherein at least two of the Fresnel zones have different periods.

16. The method of claim 11, wherein the diffractive element comprises four to five Fresnel zones per 1 mm.

\* \* \* \* \*